July 24, 1951
R. MILIK
2,561,708
ANGLE STATION FOR BELT CONVEYERS
Filed July 30, 1948
6 Sheets-Sheet 1
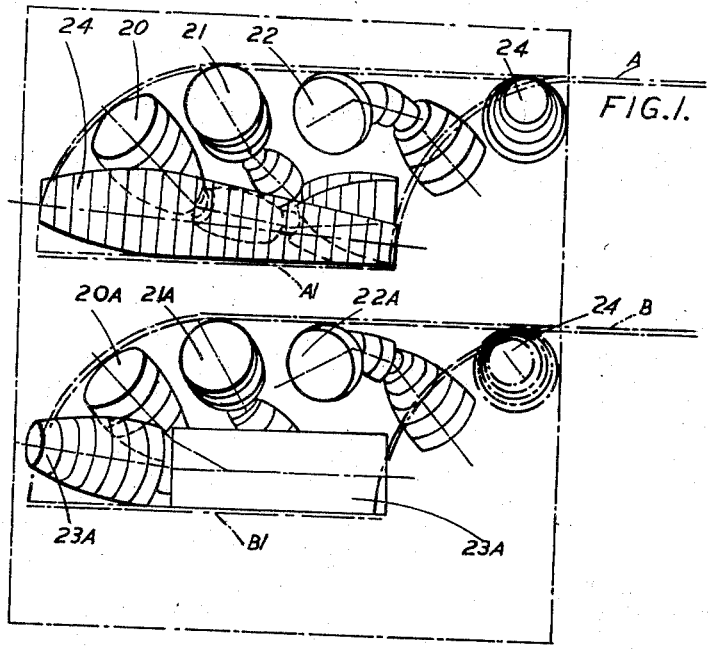
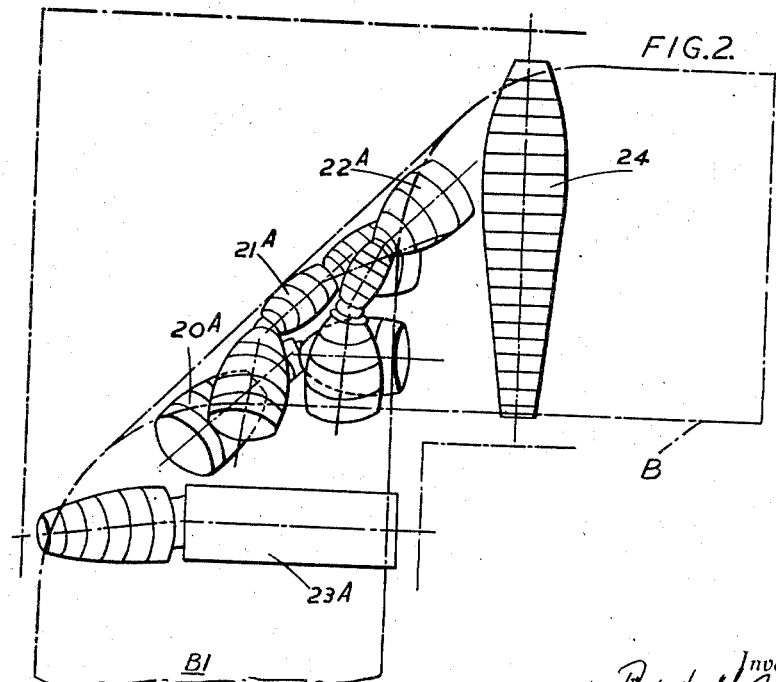

July 24, 1951            R. MILIK            2,561,708
ANGLE STATION FOR BELT CONVEYERS
Filed July 30, 1948            6 Sheets-Sheet 2
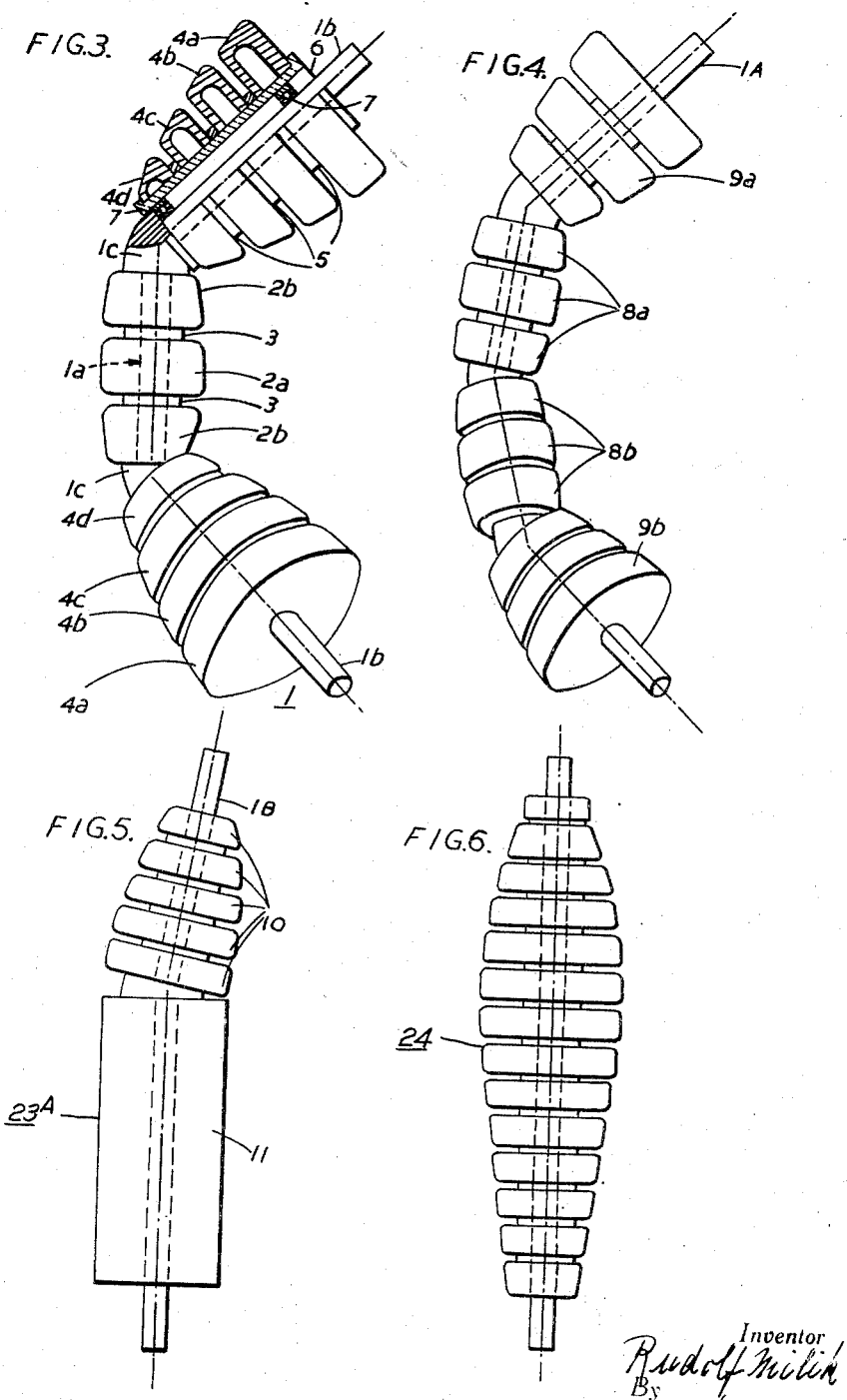

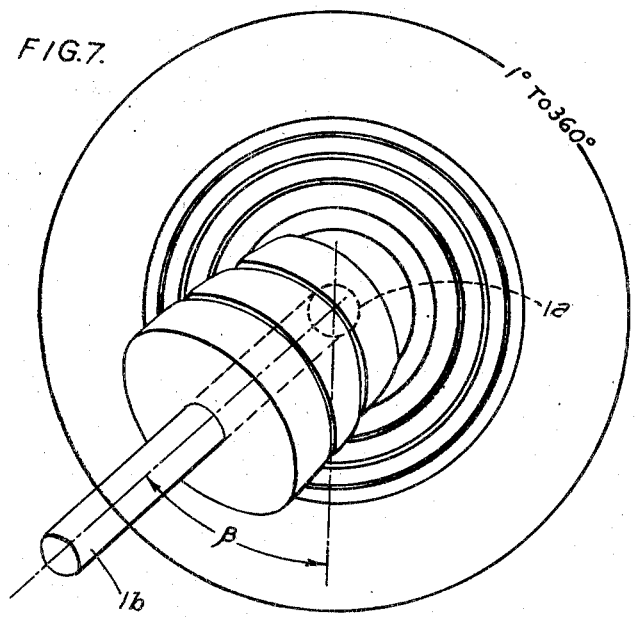
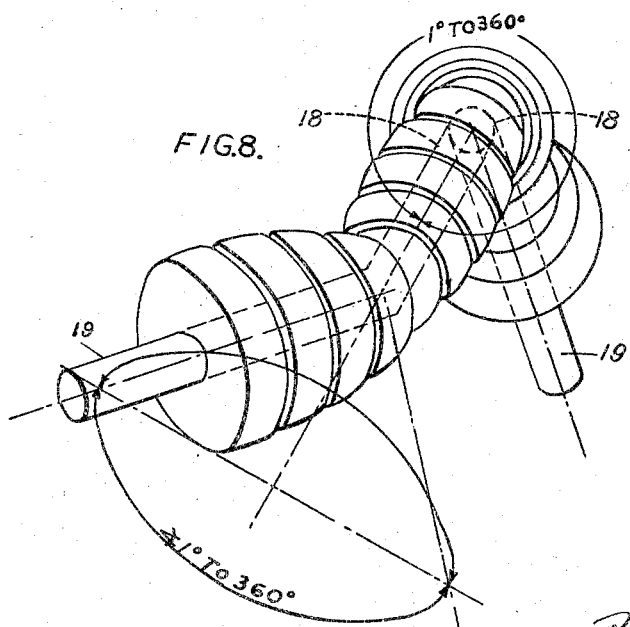

July 24, 1951 R. MILIK 2,561,708
ANGLE STATION FOR BELT CONVEYERS
Filed July 30, 1948 6 Sheets-Sheet 4
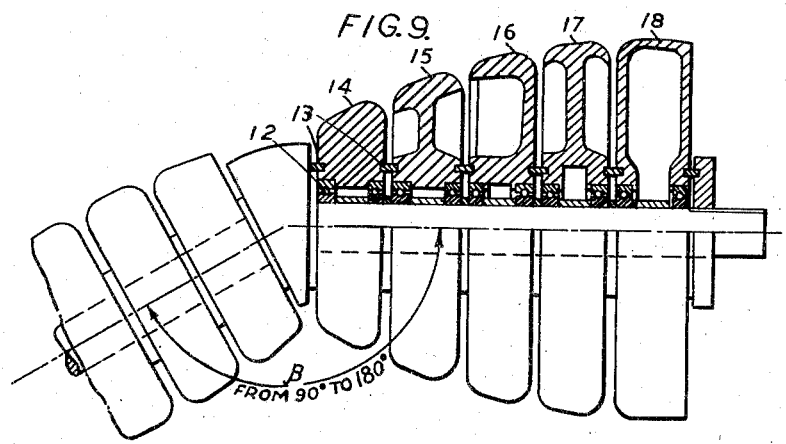
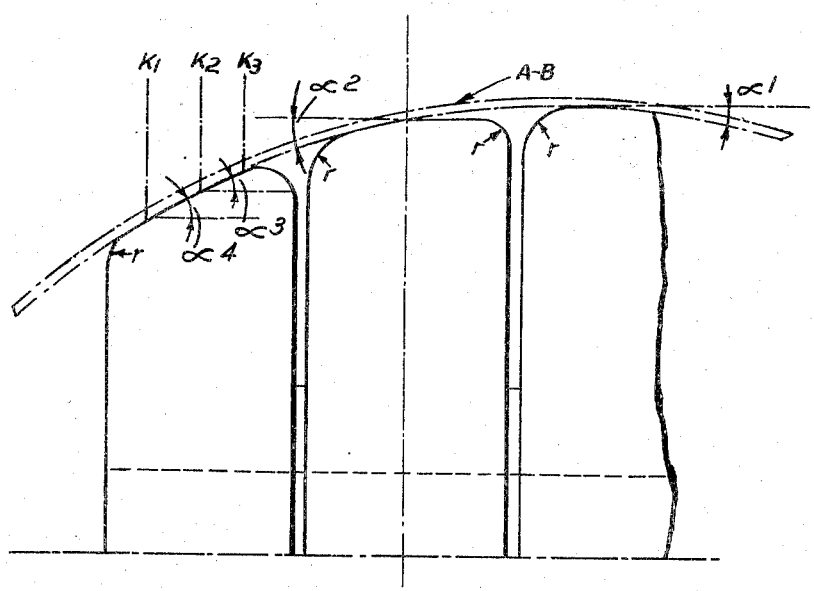
Inventor
Rudolf Milik
By
E. F. Wenderoth
Attorney July 24, 1951

R. MILIK 2,561,708

ANGLE STATION FOR BELT CONVEYERS

Filed July 30, 1948

Inventor
Rudolf Milik
By
Wenderoth, Lind & Ponack
Attorney

Patented July 24, 1951

2,561,708

UNITED STATES PATENT OFFICE 2,561,708

ANGLE STATION FOR BELT CONVEYERS

Rudolf Milik, London, England, assignor to Milik Conveyors Limited, London, England, a British company Application July 30, 1948, Serial No. 41,562
In Great Britain July 29, 1946

13 Claims. (Cl. 198—184)

This invention relates to endless belt conveyors and has particular reference to angle stations so-called, that is, to arrangements provided for supporting and controlling an endless conveyor belt where it bends to change its direction of travel, as viewed in plan, while maintaining its motion in the two directions. In changing its direction of travel the belt run becomes inverted and drops from one level to another; in other words the surface which is uppermost at the entry to the angle station becomes the undersurface of the belt run leaving the angle station at a lower level.

In the specification of my copending patent application Serial No. 586,886, I have described an angle station constructed for the purpose above-referred to, which comprises a plurality of freely revoluble sectional rollers which provide support for the inner concave surface of the belt where it changes direction and which serve simultaneously to prevent "wander" of the belt from its normal line of travel. In the angle station described in the above-noted specification, each sectional roller consists of a plurality of laterally adjacent discs which combine to form for the roller a bulging contour corresponding to the concavity of the portion of the belt supported thereby, and the sectional roller preferably has an overall length which is substantially equal to the width of the supported belt. Further, in the particular arrangement illustrated in the drawings of said specification, sectional rollers of fir-cone shape and of symmetrical elongated barrel form are shown, the freely revoluble discs which constitute each sectional roller being mounted side by side on a straight axle.

The object of the present invention is to provide an improved angle station using improved belt-supporting units of sectional roller form for use at such angle stations, said belt-supporting units affording more support at the bend of the belt than in the arrangements described in the copending specification referred to, by reason of the fact that the improved belt-supporting units provided by the present invention permit of the belt-supporting units being disposed closer together than the sectional rollers described in the copending application aforementioned, and further because in the case of belt-supporting units situated in the centre region of the belt bend they have a somewhat different and a more effective controlling action than straight axle sectional rollers in that region.

In carrying the invention into practice the angle station may comprise a framework on which is rotatably mounted a set of belt-supporting units, each unit being in effect a sectional roller which is constituted by a plurality of close-set freely revoluble discs disposed in two or more separate and distinct groups. The groups of discs which constitute a unit or sectional roller have a common axis of rotation and all the discs having a common axis of rotation contribute to the formation of a freely moving surface having a bulging contour which corresponds to the concavity of the portion of the belt supported thereby and which exerts a correcting effort to prevent "wander" of the belt from its centre line of travel.

Preferably a set of belt-supporting units comprises at least two sectional rollers in the region of the centre portion of the "bend" of the belt run, with the discs forming a sectional roller or unit rotatable upon a common axle, the two or more groups of discs being carried by portions of said common axle which are mutually inclined. Other forms of sectional roller units used will be referred to later. The belt-supporting unit has an overall length not less than the width of the supported belt. It is a feature of the invention that, in the case of those units which are employed in or near the centre of the belt bend, one end of each unit supports and controls on and by its upper side the belt run at the higher level and adjacent one side edge of the belt, maintains contact with the bending belt by means of the middle part of the unit and during the inversion of the belt run, and by its other end exercises control on the underside of the inverted belt run adjacent the opposite side edge of the belt run, said belt run now extending at the lower level beneath the unit. In most cases at least five belt-supporting units would constitute a complete set of units for supporting the bend of a belt run, and the number of groups of discs constituting the plurality of units or sectional rollers which compose a set thereof would be increased toward the centre of the bend of the belt run. Preferably an odd number of units would constitute a set, with the units, such as five units, in the set arranged symmetrically, so that the unit which is disposed at the centre of the bend of the belt run would have the largest number of groups of discs, whilst the number of groups of discs of units on opposite sides of the centre unit would be progressively decreased. The belt-supporting units constituting a set may be arranged in a number of different ways according, for example, to the width of the belt, the diameter of the bend or scroll of the belt run, and whether the belt run turns to the right or to the left. Accordingly, in some cases where the number of groups of discs forming a sectional roller or unit is equal to not less than three, the portions of the common axle supporting the two outermost groups of discs would be oppositely inclined in relation to the medial portion of the common axle, whilst in other cases the portions of the common axle supporting the two outermost groups of discs would both be inclined on the same side of the medial portion of the common axle.

The contours of the two or more sectional rollers or units composing a set would depend largely upon the position the unit has in the bend of the belt. In the regions where the belt run begins to bend away from the higher or lower level portions thereof sectional rollers of frusto-conical or fir-cone shape would be used, sometimes incorporating wide substantially plain cylindrical rollers. In all cases the several discs which constitute the unit have differing diameters so that the peripheries thereof contribute when set on mutually inclined portions of the common axle support to the formation of a bulging contour, the shape of which is determined so as to afford over substantially the whole of the length of the unit, comparatively close-set areas of supporting contact for the part of the belt to be supported. The widths of the peripheries of the discs may also be altered according to the position of the disc in the roller of which it forms part and the position of that roller in the unit.

In order that the invention may be more readily understood reference is directed to the drawings, wherein—

Figure 1 is a diagrammatic end view of an angle station employing improved forms of belt-supporting units in the form of sectional rollers, and Figure 2 is a diagrammatic plan view of the lower run supporting means;

Figures 3, 4, 5 and 6 are detail views of four kinds of sectional rollers, three of which are shown in use in Figures 1 and 2;

Figures 7 and 8 illustrate how portions of the common axle of a belt-supporting unit may be mutually inclined;

Figure 9 shows a number of different forms in which the discs constituting the sectional rollers may be made and mounted;

Figure 10 illustrates how the peripheries of the discs may be varied to alter the belt-contacting areas.

Figure 11:
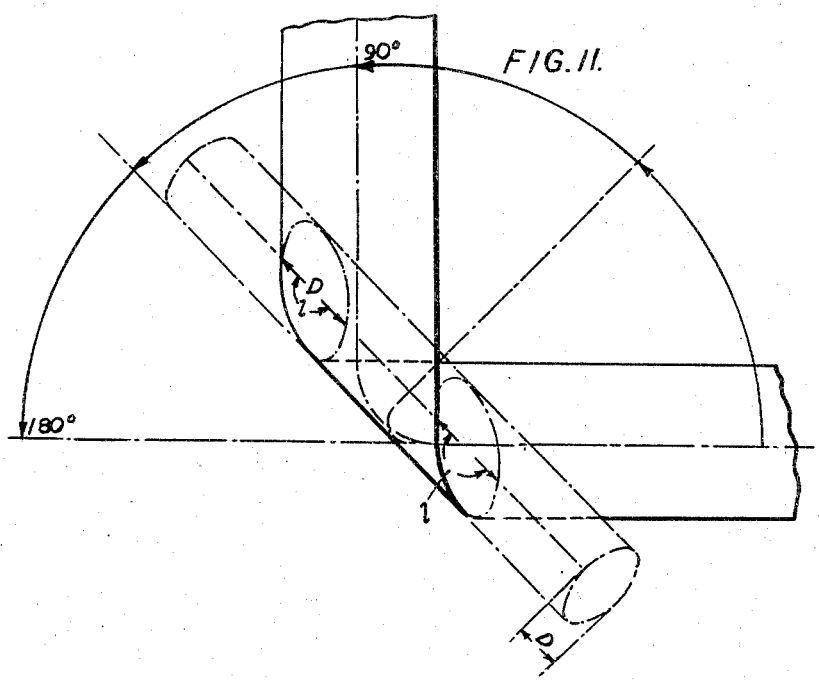
Figures 11, 12, 13 and 14 are diagrams to illustrate the mode of determining the forms of the belt-supporting units.

The angle station illustrated diagrammatically in Figures 1 and 2 shows the upper run of a conveyor belt stepped down from the level A to the level $A^1$ by reason of bending the belt to turn it through an angle of 90°, and shows also the return run of the belt similarly bent through 90° and stepped up from level $B^1$ to level B. The curved "bends" of both runs of the belt are each supported by a set of belt-supporting units each including three sectional rollers, i. e. three rollers 20, 21 and 22 for the upper run and three rollers 20A, 21A and 22A for the return run. At the regions where the straight run of the belt begins to twist for bending and again where the "bend" portion straightens out the belt is supported by two sectional rollers 24 for the upper run and by two sectional rollers 23A for the return run, or alternatively by a sectional roller 24 where level $A^1$ commences as shown in Figure 1, and by a sectional roller 23A where level $B^1$ commences, as shown in Figure 2.

The sectional rollers 20, 21, 22 and 20A, 21A, 22A may be of identical form and each of the constructions shown in Figure 3. Each unit comprises an axle 1 consisting of a centre length $1^a$ and two adjoining end lengths $1^b$, the centre and end lengths being separated by wedge-shaped collars $1^c$. On the centre length $1^a$ of the cranked axle 1, a symmetrical barrel-shaped roller section is supported which consists of a cylindrical central disc $2^a$ flanked by oppositely tapered outer discs $2^b$, separated one from the other by spacing washers 3. On each of the end lengths $1^b$ of the cranked axle 1 is freely revolubly mounted a set of discs $4^a$, $4^b$, $4^c$ and $4^d$ separated one from the other by spacing washers 5 and carried on a sleeve 6 running on ball bearings 7 mounted on the axle length $1^b$. The discs $4^a$, $4^b$, $4^c$ and $4^d$ are made with decreasing diameters so as together to constitute a tapered roller section of frusto-conical or "peg-top" form. The angles of inclination of the lengths $1^a$, $1^b$ of the axle 1 and the diameters of the rollers $2^a$, $2^b$ and $4^a$, $4^b$, $4^c$, $4^d$ are determined so that the crests of the adjacent discs all be on a common continuous arc or curve. In some cases the cranked axle 1A of the unit may comprise more than three inclined portions, for example four mutually inclined lengths, of which the two centre lengths carry identical sets of discs $8^a$, $8^b$ and the two outer lengths carry identical sets of discs $9^a$, $9^b$, as shown in Figure 4.

For use where the bend of the belt merges into the straight portion of the run the sectional rollers shown in Figures 5 and 6 may be employed; the sectional roller 23A shown in Figure 5 comprises an axle 1B consisting of two axle lengths mutually inclined, with a set of discs 10 forming a tapered part on one axle length and a single parallel-sided cylinder 11 on the other axle length. The cylinder 11 may be replaced by a number of discs of equal diameter and may be coned at one end. The sectional roller 24 shown in Figure 6 consists of a number of discs mounted on a straight axle to form a roller of fir-cone shape.

Figure 7 illustrates how the centre portion $1^a$ of the common cranked axle 1 of Figure 3 may be inclined at a compound angle in relation to axle portion $1^b$, i. e. the portion $1^b$ may, viewed endwise be set at any angle $\beta$ in relation to the axis of portion $1^a$ and also at any angular position (angle) within a complete circle (1° to 360°). Similarly in the case of a four-roller unit, the axle portions 18, 18 of the two centre rollers may be inclined, as shown in Figure 8, at any desired angle and the outer axle portions 19, 19 may be set at any desired compound angle in relation to the adjacent axle portion 18.

Figure 9 shows how each disc 14, 15, 16, 17 and 18 constituting a sectional roller may be independently mounted on its own ball bearing 12, with spacing rings 13 separating the discs. The discs 14, 15, 16 and 17 may have different constructional forms.

Figure 12:
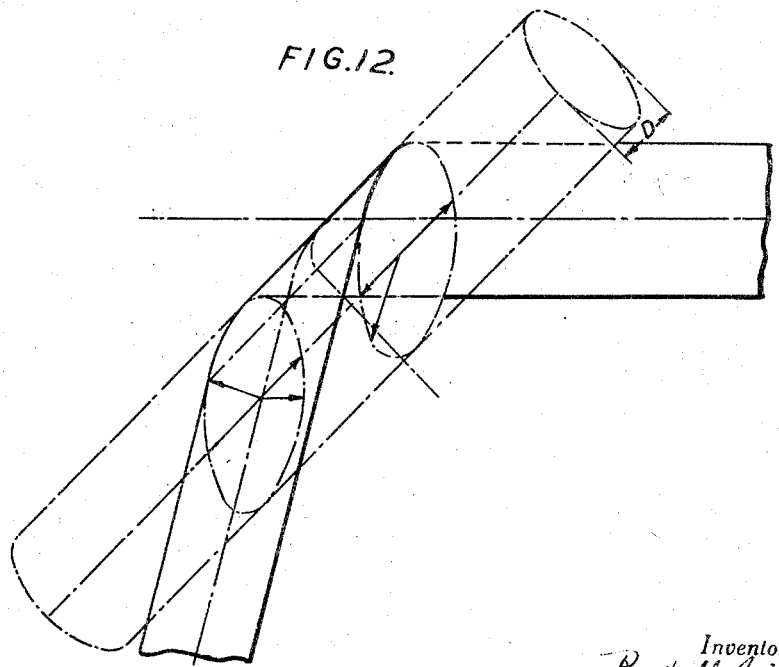

The object of using sectional rollers composed of a plurality of discs is to allow each disc to be made so as to exercise the correcting action necessary at that particular place; this action must vary from place to place along the unit because the linear speed of the bending belt varies across the width thereof. In order to reduce the friction between the belt and the disc the amount of the periphery of the disc which is in contact with the belt may be reduced so that the disc does not contact with the belt over the whole width of the disc. This may be done by forming generous corner radii $r$ at the peripheral edges of the disc and also by making part of the disc periphery inclined at an angle $a$ to the remainder of the periphery, as shown in Figure 10. Figures 11 and 12 show how belts may be turned to right or to left with a turn which, in plan, is right-angular (Figure 11) or greater than a right angle (Figure 12). The turn may be, of course, less than a right angle. The diameter of the imaginary cylinder D around which the belt may be viewed as wrapped should preferably be not less than one quarter of the width of the belt.

Figure 13:
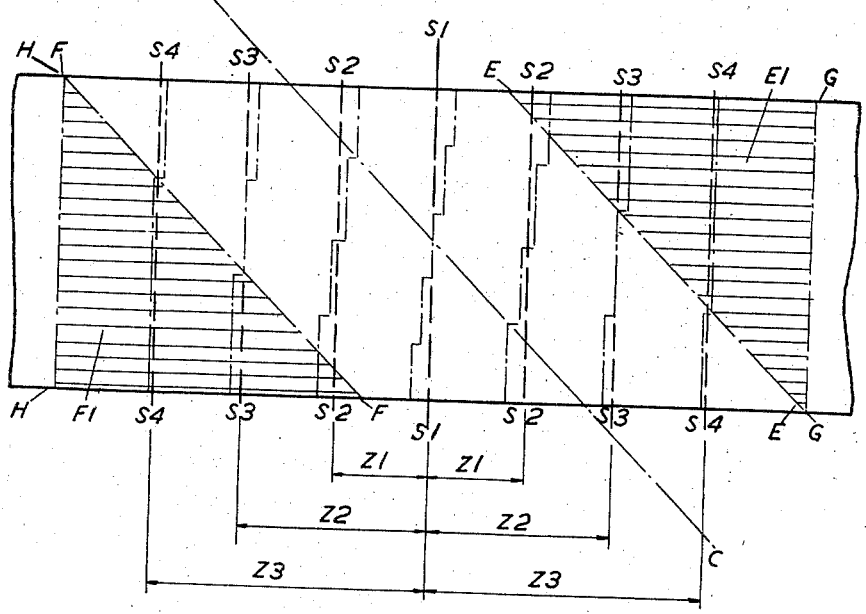
Figure 14:
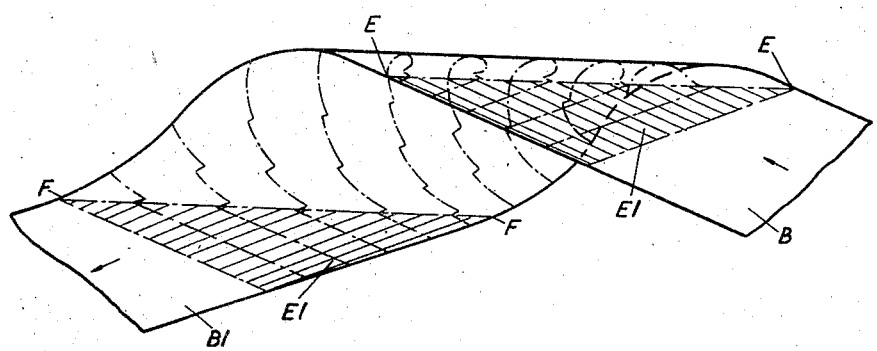

For the purpose of determining the number of units in a set and the number of sectional rollers grouped to form a unit the development of the belt in a flat plane is considered (see Figure 13) and according, among other factors, to the width of belt to be supported and the permissible difference between the level of the belt run before and after turning (i. e. the diameter D of the imaginary cylinder shown in Figures 11 and 12) a transverse layout line $S_1$, $S_1$, is set out at right angles to the edges of the belt run so as to intersect midway a line C, C set out to represent the centre of the bend of the belt and on opposite sides of layout line $S_1$, $S_1$, other transverse layout lines $S_2$, $S_2$, $S_3$, $S_3$ and $S_4$, $S_4$ are set out at distances $Z_1$ $Z_2$ and $Z_3$ respectively from line $S_1$, $S_1$. When the belt is bent as shown in Figure 14, the curvature of these layout lines indicates approximately the required contours of the belt-supporting units. When a belt run is bent so as to change its direction of travel through 90° when viewed in plan, the belt is inverted and the level of the run drops from B to $B_1$ (see Figures 2 and 14). It will be readily understood that when a conveyor belt is intended for use in an underground mine this drop distance from level B to level $B_1$ (which corresponds to the diameter D of Figure 11) must be kept as small as possible. The smallest permissible diameter D of the imaginary parallel cylinder around which the belt run may be considered to be wrapped will be largely dependent on the flexibility of the belt employed, which is determined mainly by the number of plies used in the belt, and this in turn is related to the load-carrying capacity of the belt. It will be understood by those skilled in the art of conveyor design how to arrive at the required diameter D. Theoretically the belt run commences to bend down from level B along the imaginary line E, E and merges into level $B_1$ along the imaginary line F, F and these imaginary lines E, E and F, F, in the case of 90° turn in plan, are disposed parallel to and equidistant from the centre of bend line, C, C. It will be apparent therefore that the areas $E_1$ and $F_1$, shown shaded in Figures 13 and 14 can derive support from surfaces lying parallel to the longitudinal axis of the imaginary cylinder D. In the regions of the lines G, G and H, H the belt run can be supported by plain cylindrical rollers, whilst in the region of layout lines $S_4$, $S_4$ supporting units of the kinds illustrated in Figure 5 or Figure 6 are used, as these kinds provide straight or tapering portions suitable for controlling the portions of belt run lying within areas $E_1$, $F_1$ and tapering or more acutely tapering portions suited to those curved portions of the belt run which lie in the zone bounded by lines E, E and F, F. The curvature of the belt bend is clearly greatest at the centre of the bend and it is in this region that the greatest controlling effect is required; hence sectional rollers having more groups of discs are employed. In the region of layout line $S_1$, $S_1$ the linear speed of the belt varies mostly from the edges of the belt run to the centre of width. It is well known that when a belt is passed over a conical revolving surface it has a tendency to wander to one side and this known action is used by me to good account by determining by calculation or otherwise the peripheral speed of the disc which would be situated in any particular place in the belt bend and then taking into consideration the nominal linear speed of the belt the amount of contact area between belt run and disc can be determined. The so-called "angle of embrace $l$" of the belt run must be also taken into account, which in the embodiments illustrated and generally, will be 180°, that is, the angular distance between levels B, $B_1$. Figure 10 shows how the amount of contact can vary even as between adjacent discs, that is, the distance between $K_1$, $K_3$ on the left-hand disc in Figure 10 will be more than that of the corresponding area of belt contact with the middle disc, even allowing for the difference in the amount of "embrace" between the two discs and the belt run. The cone angles of the discs will usually vary, that is, generally the angle will decrease toward the centre of a group of discs, so that angle $a^4$ is greater than $a^2$ and $a^2$ than $a^1$. A double cone can be used on a single disc as shown in the lefthand roller of Figure 10, where the angle $a^4$ between points $K_1$ and $K_2$ is greater than angle $a^3$ between points $K_2$ and $K_3$. It will thus be readily understood why three groups of discs may suffice in certain positions in the belt bend whereas a larger number of groups of discs, such as five, is necessary at the centre of bend of the belt. I have found and it can be readily demonstrated that the line of belt contact of one group of discs is in effect slightly offset in relation to that of an adjacent group of discs. This is indicated by the stepped character of the layout lines in Figures 13 and 14, where each of the offset portions represents a group of discs. It must be understood, however, that although the offset contact lines are approximately parallel the opposing ends of adjacent inclined portions of the common axle on which the groups of discs are mounted are not offset but meet or merge one into the other.

I claim:

1. An angle station for supporting and controlling a run of an endless conveyor belt where it bends with inversion of said belt run to change its direction of travel, as viewed in plan, comprising a framework, a set of belt-supporting units rotatably mounted on said framework, each unit comprising at least two sectional rollers each having an overall width not less than the width of the belt run, and each of said sectional rollers being constituted by at least two groups of closely set freely revoluble discs and the several groups of discs being rotatable upon a common axle, each portion of said common axle on which a group of discs is supported being inclined relative to the adjoining portion of said axle, all the discs constituting the sectional rollers comprising a unit combining together to form for the belt a supporting surface having a bulging contour corresponding to the cavity of the portion of the bend of the belt supported thereby.

2. An angle station as claimed in claim 1, wherein the number of groups of discs constituting a belt-supporting unit are greater the nearer the unit lies to the centre of the bend of the belt run.

3. An angle station as claimed in claim 2, wherein the set consists of an odd number of units, the unit which is disposed at the centre of the bend of the belt run having the largest number of groups of discs whilst the number of rollers of units on opposite sides of the centre unit is progressively decreased, the several groups of discs of each unit being revolubly supported on mutually inclined axles.

4. An angle station as claimed in claim 1, characterized in that the number of groups of discs mounted on a common axle to form a unit is equal to not less than three, and that the portions of said common axle supporting the two outermost rollers are oppositely inclined in relation to the medial portion of said common axle.

5. An angle station as claimed in claim 2, characterized in that the number of groups of discs forming a unit is equal to not less than three and that the portions of the common axle supporting the two outermost groups of discs are both inclined on the same side of the medial portion of said common axle.

6. An angle station as claimed in claim 1, wherein three groups of discs form a unit, the centre group constituting a surface being substantially of barrel form and the two outer groups constituting surfaces substantially of frusto-conical form with the small ends of the outer groups of discs adjoining said centre group.

7. An angle station as claimed in claim 1, wherein four or more groups of discs form a unit, the two or more centre groups of discs being each substantially of barrel form and the two outer groups of discs substantially of frusto-conical form with the small end of each outer roller facing the end of the adjacent centre roller.

8. An angle station comprising a plurality of sets of belt-supporting units as claimed in claim 2, each set supporting and controlling the bend in a belt run and said plurality of sets of belt-supporting units being mounted on a common framework.

9. An angle station for supporting and controlling for prevention of "wandering" a run of an endless belt where it bends with inversion of said belt run to change its direction of travel, as viewed in plan, comprising a framework; at least three cranked axles non-rotatably supported in said framework, each of said axles having at least two mutually inclined portions; and groups of closely-set discs freely and independently revoluble on each of said axles, with a group of discs on each axle portion the plurality of discs grouped on each cranked axle having various diameters which are such as to combine to form, for the centre of the "bend" of the belt run which is to be supported, a supporting unit in the form of a sectional roller having a bulging contour which corresponds to the curving line of contact between the grouped discs supported on said common cranked axle and the portion of belt run to be supported, so as to afford closely set places of support and control against "wandering" functioning over the full width of said belt run.

10. An angle station according to claim 9, wherein each of the cranked-axle supporting units in the region of the centre of the belt affords support near one edge of the belt by passing beneath the belt run before inversion due to bending and near the opposite edge of the belt by passing above the belt run after bending.

11. An angle station according to claim 9, wherein the sectional rollers in the centre portion of the "bend" of the belt run are flanked by at least one additional sectional roller.

12. An angle station according to claim 11, characterised in that the additional sectional roller comprises a plurality of closely set freely revoluble discs on a single straight axle.

13. An angle station according to claim 11, characterised in that the additional sectional roller comprises a parallel sided cylinder and a group of discs of graduated diameter decreasing in size toward an end of said sectional roller, said cylinder and said group of discs being respectively mounted for free rotation upon mutually inclined portions of a common axle.

RUDOLF MILIK.

REFERENCES CITED

The following references are of record in the file of this patent:

UNITED STATES PATENTS

| Number | Name | Date |
| --- | --- | --- |
| 714,812 | Mann | Dec. 2, 1902 |
| 772,968 | Smith | Oct. 25, 1904 |
| 2,169,624 | Weiss | Aug. 15, 1939 |
| 2,222,019 | Buchanan | Nov. 19, 1940 |
| 2,267,970 | Boal | Dec. 30, 1941 |

FOREIGN PATENTS

| Number | Country | Date |
| --- | --- | --- |
| 528,450 | Germany | June 29, 1931 |